United States Patent [19]

Kanayama et al.

[11] Patent Number: 5,220,703
[45] Date of Patent: Jun. 22, 1993

[54] COMBINATION OF OPTICAL CONNECTOR CLEANER AND HOLDER JIG

[75] Inventors: Kazunori Kanayama; Etsuji Sugita, both of Tokyo; Ryo Nagase; Shinichi Iwano, both of Ibaraki, all of Japan

[73] Assignee: Nippon Telegraph & Telephone Co., Japan

[21] Appl. No.: 854,694

[22] Filed: Mar. 20, 1992

Related U.S. Application Data

[63] Continuation of Ser. No. 493,742, Mar. 15, 1990, Pat. No. 5,117,528.

[30] Foreign Application Priority Data

Apr. 6, 1989 [JP] Japan .................................. 1-85722

[51] Int. Cl.⁵ .............................................. A47L 25/00
[52] U.S. Cl. ...................................... 15/210.1; 15/97.1; 15/231; 15/268; 385/53; 385/60; 385/147
[58] Field of Search ...................... 15/88.1-88.3, 15/97.1, 99, 100, 102, 103.5, 118, 210.1, 228, 231, 268, DIG. 12, DIG. 13; 242/67.1 R, 67.3 R, 197, 199; 360/128, 130.33, 132, 137; 369/72; 385/53, 60, 147

[56] References Cited

U.S. PATENT DOCUMENTS

| | | | |
|---|---|---|---|
| 3,439,922 | 4/1969 | Howard | 15/210.1 X |
| 3,761,984 | 10/1973 | Hauschild et al. | 15/88.3 |
| 4,004,314 | 1/1977 | Post et al. | 15/210.1 X |
| 4,354,292 | 10/1982 | Telestad et al. | 15/102 X |
| 4,462,056 | 7/1984 | Kara | 360/128 |
| 4,614,270 | 9/1986 | Oishi | 360/132 X |
| 4,637,089 | 1/1987 | Schwarz | 15/210.1 X |
| 4,638,393 | 1/1987 | Oishi et al. | 360/132 |
| 4,645,295 | 2/1987 | Pronovost | 385/60 X |
| 4,750,804 | 6/1988 | Osaka et al. | 385/55 |
| 4,792,876 | 12/1988 | Cook et al. | 15/210.1 X |
| 4,953,929 | 9/1990 | Basista et al. | 385/55 |

FOREIGN PATENT DOCUMENTS

| | | | |
|---|---|---|---|
| 3292 | 8/1979 | European Pat. Off. | 15/97.1 |
| 10120 | 1/1977 | Japan | 242/199 |

Primary Examiner—Harvey C. Hornsby
Assistant Examiner—Charles Cooley
Attorney, Agent, or Firm—Wigman, Cohen, Leitner & Myers

[57] ABSTRACT

To microscopically clean the ferrule end surface of an optical connector simply, uniformly and securely, the optical connector cleaner comprises a cleaning cloth woven with ultrafine fiber less than 0.1 denier; a casing formed with at least one opening for protecting the cleaning cloth from dust; and a mechanism for shifting the cleaning cloth exposed in the opening for cloth renewing, after the ferrule end surface has been rubbed with the cleaning cloth for cleaning. Further, it is preferable to provide an elastic member under the cleaning cloth for applying a constant cleaning pressure against the cloth and a guide member over the cleaning cloth for securely cleaning the ferrule end surface. The cloth shift mechanism is operated manually by the user or automatically by a motor. A holder jig holds the optical connector to facilitate cleaning of the ferrule end surface. The holder jig supports the optical connector such that the ferrule projects from the holder jig.

8 Claims, 13 Drawing Sheets

COMBINATION OF OPTICAL CONNECTOR CLEANER AND HOLDER JIG

This is a continuation of co-pending application Ser. No. 07/493,742 filed on Mar. 15, 1990, now U.S. Pat. No. 5,117,528.

BACKGROUND OF THE INVENTION

1. Field of the Invention

The present invention relates to an optical connector cleaner for cleaning a ferrule end surface of an optical fiber connector at optical connector junction job sites or in the manufacturing process.

2. Description of the Prior Art

Conventionally, optical connectors of various types have been used to facilitate connection or disconnection of optical fibers. For instance, in the case of a single fiber connector, an optical fiber is bonded at a center of a cylindrical rod (called herein a cylindrical ferrule); the cylindrical ferrule is inserted into a precisely-formed cylindrical hollow portion of an alignment sleeve; and then two opposing ferrule end surfaces are butted together and connected to each other for alignment of the two opposite fibers. Further, in the case of a multifiber connector, a plurality of fibers are arranged in a predetermined position and bonded to a resin cubic body (called herein a cubic ferrule); and then the two cubic ferrules are engaged with each other via two guide pins and two small-diameter guide holes so that two opposing ferrule end surfaces of a plurality of arranged fibers are butted and connected to each other for alignment of two opposite fibers, respectively.

These optical connectors are widely used in particular, in the optical communications field, because the optical connectors are provided with excellent connection characteristics. In these optical connectors, however, since the two opposite end surfaces of the optical fibers are directly connected to each other, in case the ferrule end surfaces are contaminated by contaminants such as dust or oil, the connection characteristics are markedly deteriorated.

Figure 1A:
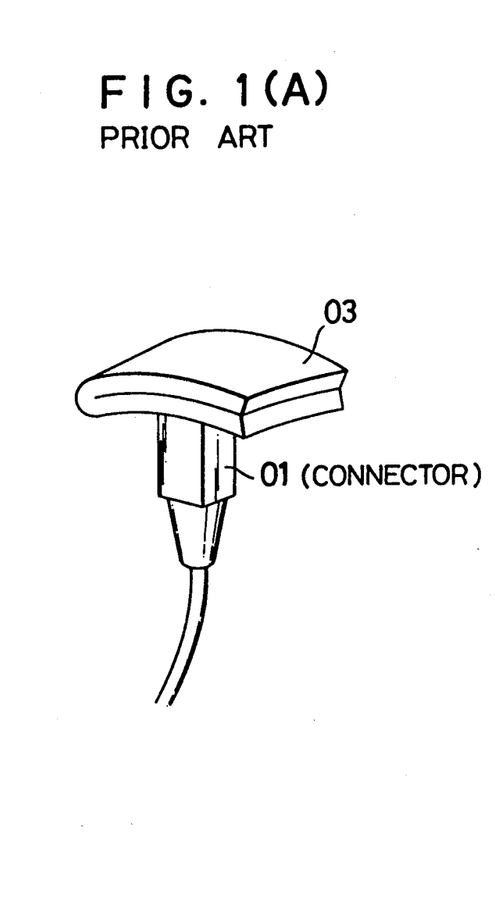
FIGS. 1(A) and (B) are perspective views for assistance in explaining the conventional optical connector cleaning method.
Figure 1B:
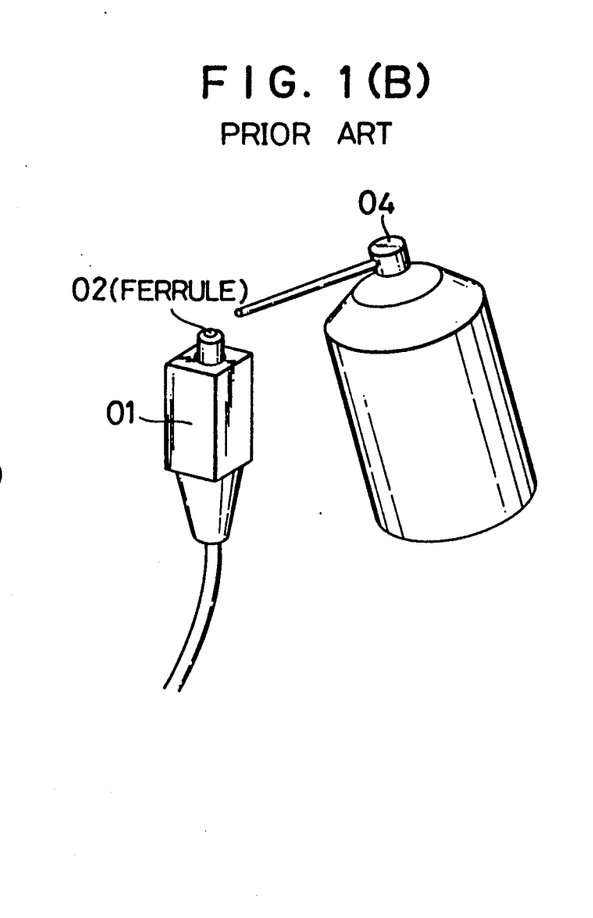

Therefore, it is indispensable to clean the ferrule end surface before the ferrules are connected to each other. Conventionally, as shown in FIGS. 1(A) and 1(B), the end surface of the ferule 02 of an optical connector 01 has been wiped by soft cloth or paper 03 dampened with ethanol and then flone gas (a general term representative of fluorocarbon) 04 has been blown against the end surface of the ferrule 02 to remove the remaining ethanol and cloth or paper dust.

In the conventional cleaning method, however, there exist various problems in that the cleaning work is complicated; the end surface of the ferrule 02 is contaminated with moisture due to the evaporation heat of the ethanol or with a fluid when a flone gas cylinder vessel (bombé) is reversed on the ferrule 02.

SUMMARY OF THE INVENTION

With these problems in mind, therefore, it is the primary object of the present invention to provide an optical connector cleaner by which the ferrule end surface can be microscopically cleaned simply and uniformly, without being subjected to the influence of the worker's skillfulness and without use of any chemicals.

To achieve the above-mentioned object, the optical connector cleaner for cleaning a ferrule end surface of an optical connector, according to the present invention, comprises: (a) a cleaning cloth (30, 30A) woven by ultrafine fiber less than 0.1 denier; (b) a casing (20, 22, 25, 27) formed with at least one opening (20a, 22a, 60a, 62a), for protecting said cleaning cloth from dust; and (c) means (40, 41, 42, 41A, 42A) for shifting said cleaning cloth exposed in the at least one opening for cloth renewing, after the ferrule end surface has been rubbed with said cleaning cloth along the opening formed in said casing.

In the first embodiment of the present invention, said cleaning cloth is a disk-shaped cloth (30); said casing is formed with a slot opening (20a); and said shifting means is a shaft (40) for rotatably supporting said disk-shaped cloth at a center of said cleaning cloth and within said casing. In the second embodiment of the present invention, said cleaning cloth is a tape (30A); and said shifting means comprises a supply reel (41) for supplying said tape-shaped cleaning cloth and a take-up reel (42) for taking-up said cleaning cloth from said supply reel through the opening (22a) formed in said casing. Further, in the second embodiment, it is preferable that the cleaner comprises first and second guide rollers (43A, 43B), an elastic member (50) disposed at the opening formed in the casing and under the cleaning cloth to apply an elastic pressure to the ferrule end surface, and a guide member (60) disposed at the opening formed in the casing and over the cleaning cloth.

In the third embodiment of the present invention, the cleaner further comprises: (a) a ratchet mechanism for pivoting said take-up reel (42) by a predetermined angle to expose a new cleaning cloth under the opening formed in said casing; and (b) a slidable cover (90) associated with said ratchet mechanism, for covering the opening formed in said casing when said ratchet mechanism is actuated to a first position and exposing the opening when said ratchet mechanism is actuated to a second position. Further in the fourth embodiment of the present invention, the cleaner further comprises: (a) a movable guide member (62) disposed at the opening formed in said casing and over said cleaning cloth and formed with one guide hole (62a) for guiding the ferrule end surface; and (b) an automatic take-up reel and guide member driving mechanism for moving said cleaning cloth in a first direction (Y) and reciprocating said movable guide member (62) in a second direction (X) perpendicular to the first direction on said cleaning cloth in association with said slot.

In the optical connector cleaner according to the present invention, since the cleaning cloth is woven by ultrafine fiber less than 0.1 denier, it is possible to remove contaminants such as oil, fingerprint, etc. by rubbing the ferrule end with the dry cloth without using any solvent such as ethanol.

When the cleaning cloth is formed into a disk shape as in the first embodiment, a new clean portion of the cloth can be exposed by simply turning the cloth disk. Further, when the cleaning cloth is formed into a tape and wound around the supply reel, it is possible to securely expose a new clean portion thereof by winding the used portion thereof around the take-up reel.

Further, when the elastic member is disposed under the cleaning cloth at the casing opening, since the cleaning cloth and the elastic member are both deformed according to the shape of the ferrule end, it is also possible to clean the side surface of the ferrule end in addition to the ferrule extreme end surface. Further, when the guide member is disposed over the cleaning cloth at the casing opening and the ferrule is inserted into the guide hole of the guide member, since the ferrule side is guided along the inner surface of the guide hole and further the lower portion of the plug body is guided along the upper surface of the guide member, it is possible to make uniform the contact or cleaning pressure against the cleaning cloth, and also to simplify the cleaning work.

Here, the relative movement of the ferrule to the cleaning cloth is restricted to a circular motion when the guide hole is formed into a circular shape and to a rectilinear motion when formed into a slot shape, thus standardizing the cleaning work.

Further, typically, the ferrule of a single fiber optical connector is attached to the plug body so as to be axially movable relative to the plug body via a coil spring. However, in the case where the ferrule and the plug body are fixed to each other as in the case of a multifiber optical connector, an optical connector support jig is used in such a way that the ferrule end projects from the support jig and further an elastic body is disposed between the plug body and the support jig on the side remote from the ferrule end surface. When this optical connector support jig is pushed against the guide member, a pressure can be applied between the cleaning cloth and the ferrule end surface due to the deformation of the above-mentioned elastic body. When the support jig is moved under these conditions it is also possible to simplify and make uniform the cleaning work of the multifiber optical connector.

Further, since the distance ($L_2$ or $L_4$) between the surface of the guide member on the optical connector side and the cleaning cloth is designed to be a little shorter than the length ($L_1$ or $L_3$) between a ferrule end surface (2a or 12a) and an end surface of a plug body (1A) of the optical connector (1) or an end surface (70c) of the holder jig (70), when the ferrule end surface is pushed against the cleaning cloth by deforming the coil spring disposed within the optical connector or the elastic body disposed within the optical connector support jig and the elastic member disposed under the cleaning cloth, it is possible to make uniform the pressure between the ferrule end surface and the cleaning cloth.

Further, when the surface of the elastic member disposed under the cleaning cloth is formed into a semicylindrical shape, since the uppermost portion of the elastic member is deformed according to the wide end surface of the multifiber connector, a uniform pressure can be securely applied to the end surfaces of the fibers arranged at the end surface of the cubic ferrule, thus it being possible to clean the ferrule end surfaces more stably.

BRIEF DESCRIPTION OF THE DRAWINGS

The features and advantages of the optical connector cleaner according to the present invention will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

Figure 2:
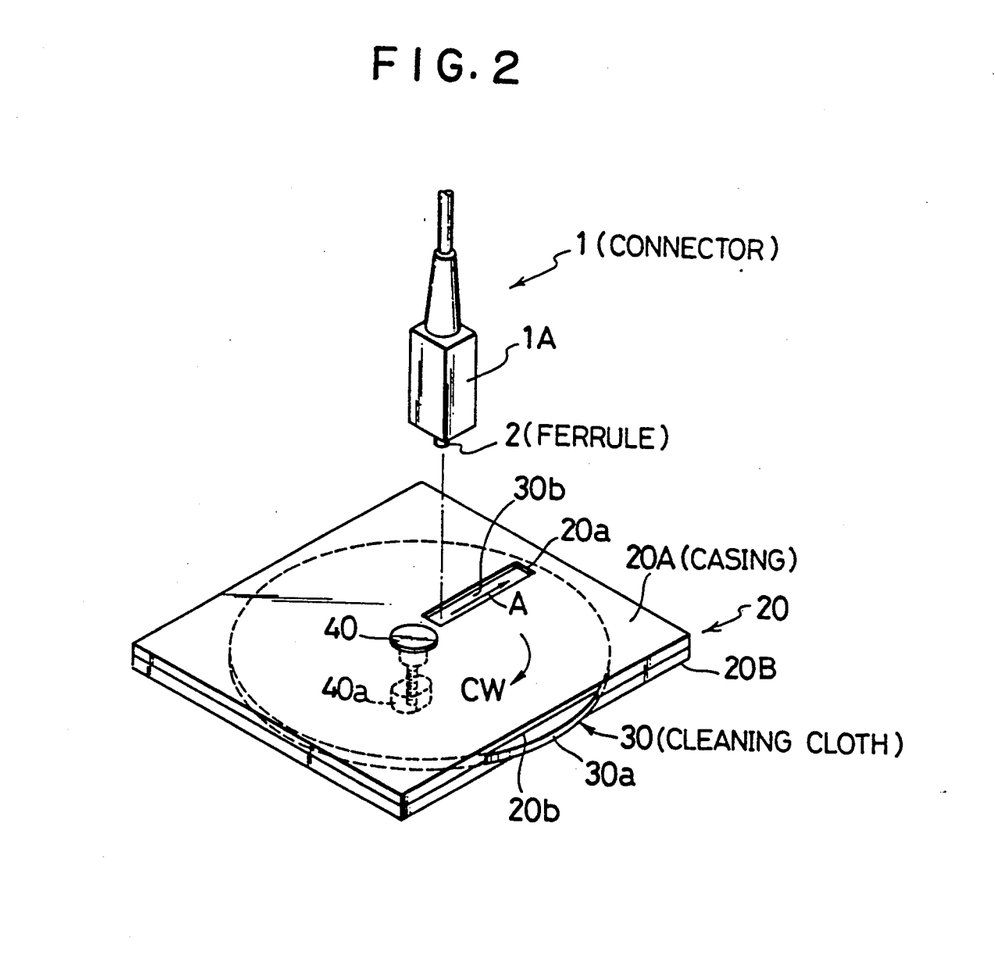
FIG. 2 is a perspective view showing a first embodiment of the optical connector cleaner according to the present invention.

Embodiments of the optical connector cleaner according to the present invention will be described in detail hereinbelow with reference to the attached drawings. FIG. 2 shows a first embodiment thereof, which comprises a flat square casing 20 spittable into two upper and lower half casings 20A and 20B, a circular cleaning cloth 30 rotatably supported on a disk-shaped elastic material (e.g. rubber) (not shown) disposed on the inner surface of the lower half casing 20B, and a central shaft 40 for sandwiching the cleaning cloth 30 between the two half casings 20A and 20B in cooperation with a nut 40a so that the cleaning cloth 30 is rotatable about the central shaft 40. The upper half casing 20A is formed with a cleaning slot 20a into which a ferrule 2 attached to a plug body 1A of an optical connector 1 can be inserted and moved therealong in contact with part of the surface of the cleaning cloth 30 for cleaning. Further, each of the two half casings 20A and 20 is formed with a side opening 20b on each side surface thereof so that an outer circumferential portion 30a of the cloth 30 can be exposed therethrough and therefore rotated manually by the user.

The cleaning cloth 30 is formed of ultrafine fiber less than 0.1 denier (a unit representative of a weight (gram) of 9-km yarn). The casing 20 is made of a resin material, for instance. The width of the opening slot 20a is a little wider than the diameter of the ferule 2.

In use, the cleaning cloth 30 is rotated a little in a predetermined direction (e.g. clockwise as shown by an arrow (CW in FIG. 2) to expose a new clean part of the cleaning cloth 30b in the cleaning slot 20a, by putting a finger end of the user onto the circumferential surface of the exposed arcuate portion 30a of the cleaning cloth 30. Thereafter, an end surface of the ferrule 2 is moved along the cleaning slot 20a in contact with the cleaning cloth 30 in the arrow direction A. Since the ferrule end surface can be slid on or rubbed with the cleaning cloth by deforming the cleaning cloth 30 and the elastic material (not shown), it is possible to securely clean the ferrule end surface. Further, the cleaning cloth 30 is further rotated a little, after the ferrule end surface has been cleaned, in order that the used cloth portion will not be used again.

In this embodiment, polyester-based cloth called Miracreation (Trademark of TORE Corp.) is used for the cleaning cloth. Without being limited thereto, however, it is also possible to use any (e.g. nylon-based) cleaning cloth less than about 0.1 denier, without use of any other cleaning solvent such as ethanol. This first embodiment is simple in structure, small in size, and handy at work sites.

Figure 3:
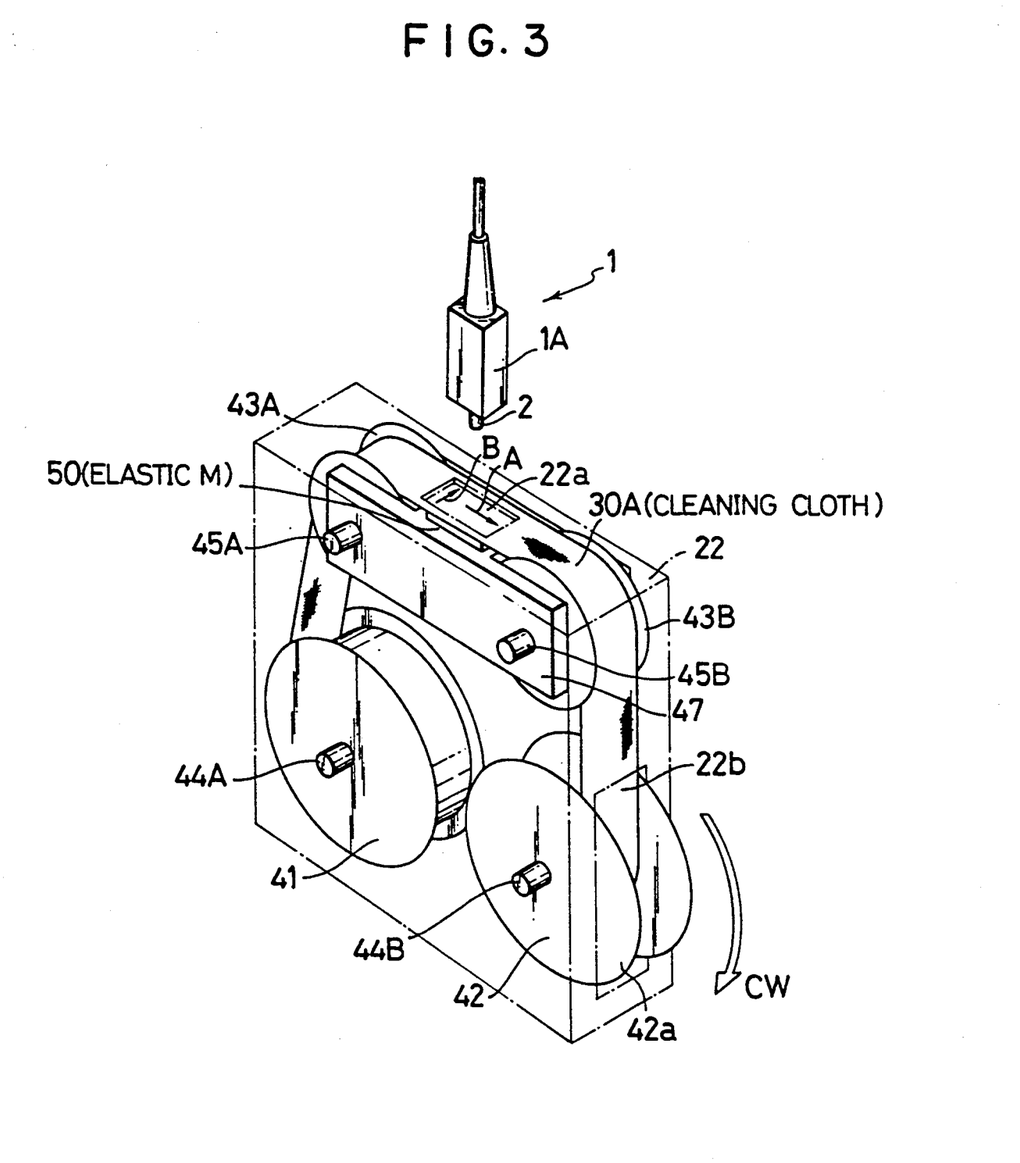
FIG. 3 is a perspective view showing a second embodiment of the optical connector cleaner according to the present invention, in which an elastic member is disposed under the cleaning cloth.

FIG. 3 shows a second embodiment of the optical connector cleaner according to the present invention, which comprises another square casing 22, a supply reel 41 rotatably supported by the casing 22 via a supply reel shaft 44A, a take-up reel 42 also rotatably supported by the casing 22 via a take-up reel shaft 44B, a pair of guide roller support members 47 supported within the casing 22, a pair of guide rollers 43A and 43B both rotatably supported between the two guide roller support members 47 via two guide roller shafts 45A and 45B, respectively, a tape-shaped cleaning cloth 30A, and an elastic (e.g. rubber) member 50 disposed under the cleaning cloth 30A and between the two guide rollers 43A and 43B. Further, as shown, the casing 22 is formed with an upper cleaning opening 22a to which the plug body 1A of the connector 1 can be fitted and with a side opening 22b on one side surface thereof so that an outer circumferential portion 42a of the take-up reel 42 can be exposed therethrough and therefore rotated manually by the user. The tape-shaped cleaning cloth 30A wound around the supply reel 41 is reeved from the supply reel 41, through the two guide rollers 43a and 43B, to the take-up reel 42.

In use, the take-up reel 42 is rotated a little in the clockwise direction as shown by arrow CW in FIG. 3 to expose a new clean part of the cleaning cloth 30a just under the cleaning opening 22a, by putting a finger end of the user onto the outer circumference 42a of the take-up reel 42. Thereafter, an end surface of the ferrule 2 is moved along the inner end surface of the opening 22a in the longitudinal or transverse direction A or B of the cleaning cloth 30A in such a way that the ferrule end surface is pushed against the cleaning cloth 30A. In this embodiment, since the take-up reel 42 is rotated a little further in the clockwise direction CW after use by putting the user's finger end onto the exposed circumferential portion 42a of the take-up reel 42, it is always possible to renew the cleaning cloth 30A at the opening 22A.

Further, it is also preferable to provide a ratchet mechanism for each reel 41 or 42 to prevent each reel from being rotated in the reverse (counterclockwise) direction, so that the used cloth portion will not be returned under the cleaning opening 22a. Further, the elastic member 50 is disposed under the cleaning cloth 30A at the cleaning opening 22a. However, it is also possible to use a relatively hard material instead of a soft material such as rubber.

Figure 4A:
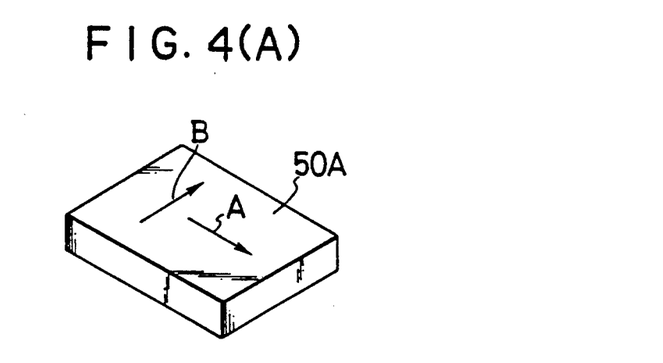
FIG. 4(A) is a perspective view showing a basic elastic member disposed under a cleaning cloth of the second embodiment shown in FIG. 3.
Figure 4B:
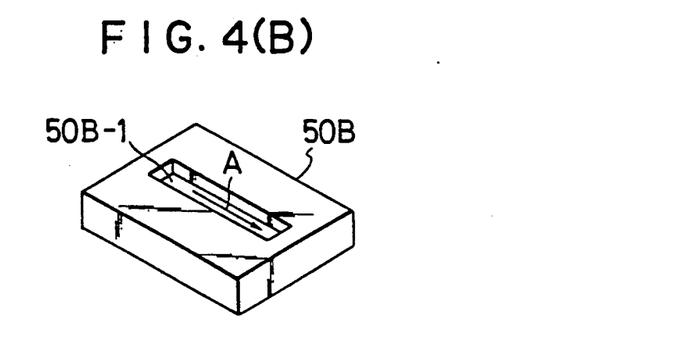
FIG. 4(B) is a perspective view showing a first modification of the elastic member thereof.
Figure 4C:
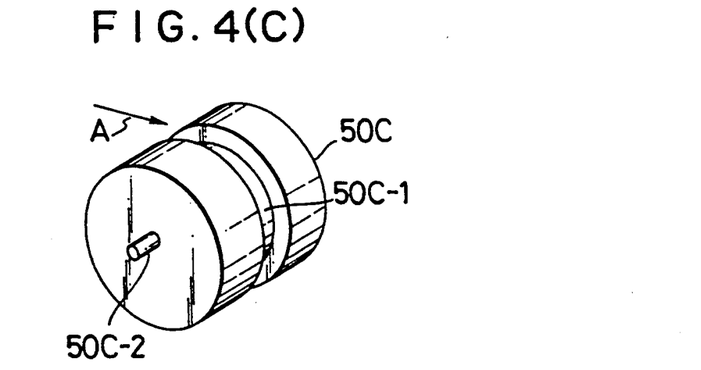
FIG. 4(C) is a perspective view showing a second modification of the elastic member thereof.
Figure 4D:
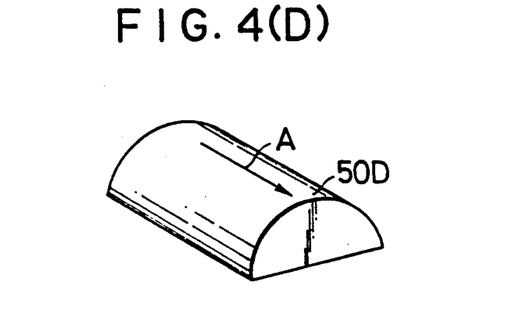
FIG. 4(D) is a perspective view showing a third modification of the elastic member thereof.

FIG. 4(A) shows a basic flat elastic member 50A, by which the ferrule end surface can be moved in the longitudinal or transverse direction A or B of the cleaning close 30A, as already explained. FIG. 4(B) shows another modification of the elastic member 50B formed with a groove 50B-1 with a width a little wider than the outer diameter of the ferrule 2 to be cleaned. In this case, since the ferrule 2 is moved or slid on the cleaning cloth 30A along the groove 50B-1 in the longitudinal direction A of the cloth 30A, it is also possible to clean the side surface near the ferrule extreme end surface simultaneously. Further, since the cleaning cloth 30A is elongated within and along the groove 50B-1 when the ferrule 2 is pushed against the cloth 30A, the ferrule 2 can be moved smoothly under pressure along the groove 50B-1 without scratching the cleaning cloth 30A. FIG. 4(C) shows another modification of the elastic member 50C. In this modification, a cylindrical elastic member 50C is rotatably supported by the two guide roller support members 47 via an elastic member shaft 50C-2 and formed with an annular groove 50C-1 having a width a little wider than the outer diameter of the ferrule 2. In this modification, it is possible to reduce the frictional force between the elastic member 50C and the cleaning cloth 30A when the ferrule 2 is pushed against and moved on the cloth 30A along the annular groove 50C-1 under pressure in the longitudinal direction A of the cloth 30A. Further, FIG. 4(D) shows the other modification of the elastic member 50D. In this modification, a semicylindrical elastic member 50D is disposed under the cleaning cloth 30A at the opening 22a. This elastic member is suitable, in particular when a multifiber optical connector is moved along the axial direction A (the same as the cloth longitudinal direction) as described in further detail later with reference to FIGS. 9(A) and (B).

Further, the above-mentioned elastic member 50 is not necessarily required, as long as an appropriate tension is applied to the cleaning cloth 30A by providing a rachet wheel and a ratchet pawl for each reel 41 or 42. In this case, the ferrule 2 is moved along the inner edge of the cleaning opening 22a in pressure contact with the cleaning cloth 30A.

Figure 5:
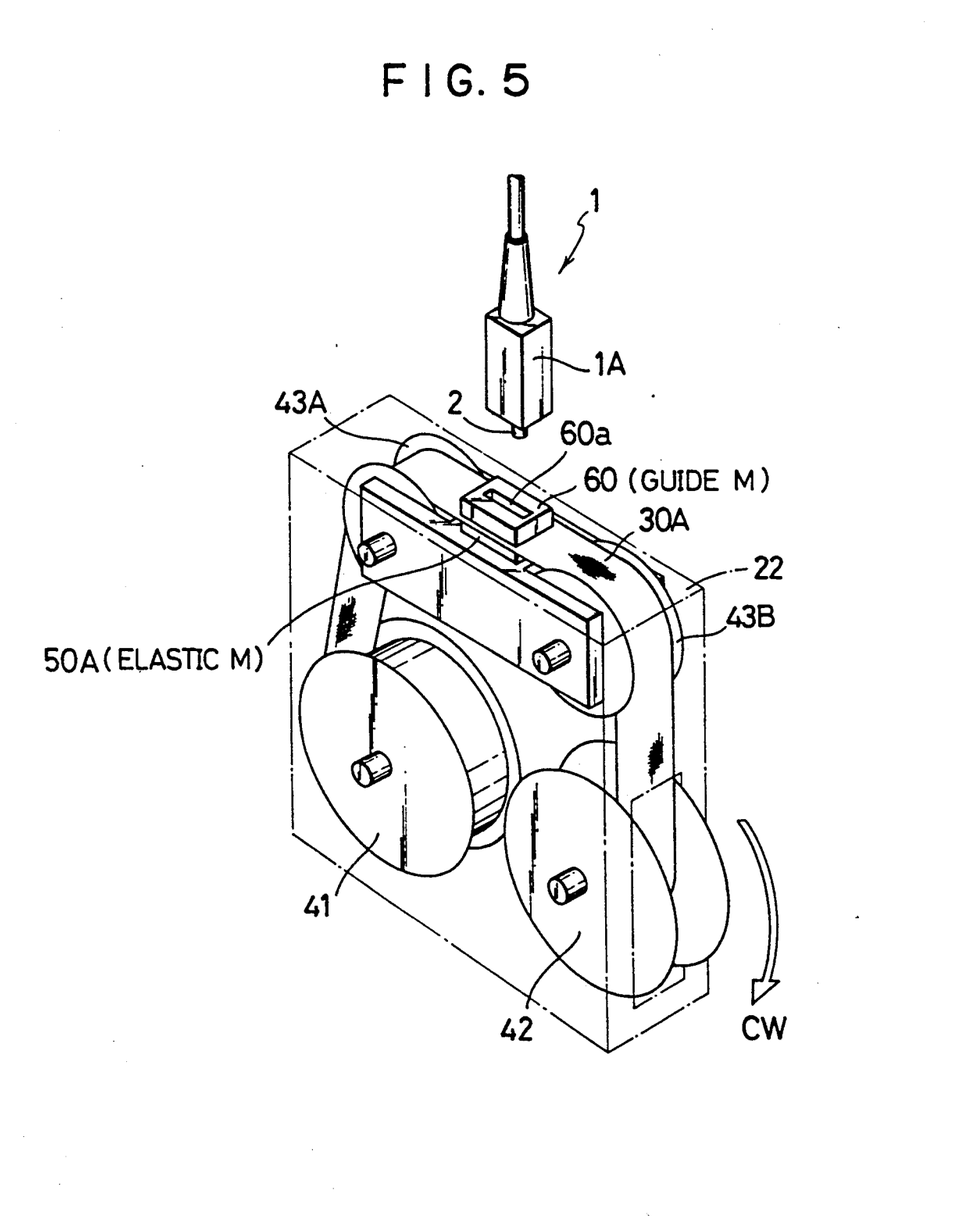
FIG. 5 is a perspective view showing the second embodiment of the optical connector cleaner according to the present invention, in which a guide member is disposed over the cleaning cloth.

FIG. 5 shows the second embodiment of the optical connector cleaner according to the present invention, in which a guide member 60 formed with at least one guide hole 60a is additionally provided on the cleaning cloth 30A. The tape-shaped cleaning cloth 30A is wound around the supply reel 41, guided by the two guide rollers 43A and 43B, and wound again by the take-up reel 42. The flat elastic member 50A and the guide member 60 are disposed at the cleaning opening of the casing 22 with the cleaning cloth 30A sandwiched between the elastic member 50A and the guide member 60. The guide member 60 is formed with singular or plural guide slots or circular holes.

Figure 6A:
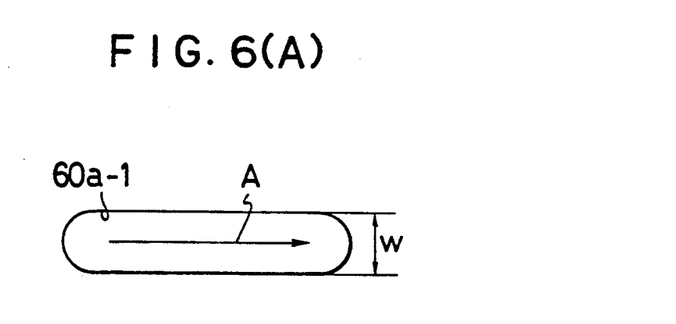
FIG. 6(A) is a top view showing a slot-shaped guide hole formed in the guide member.
Figure 6B:
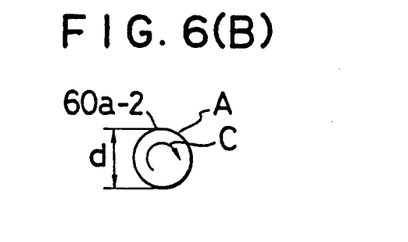
FIG. 6(B) is a top view showing a circular guide hole formed in the guide member.
Figure 6C:
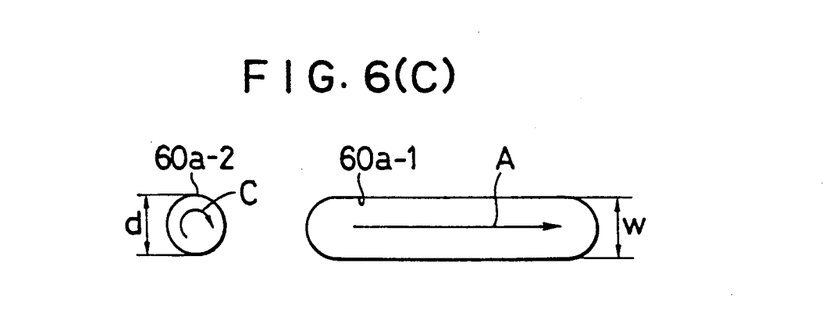
FIG. 6(C) is a top view showing a set of series-arranged circular and slot-shaped guide holes formed in the guide member.
Figure 6D:
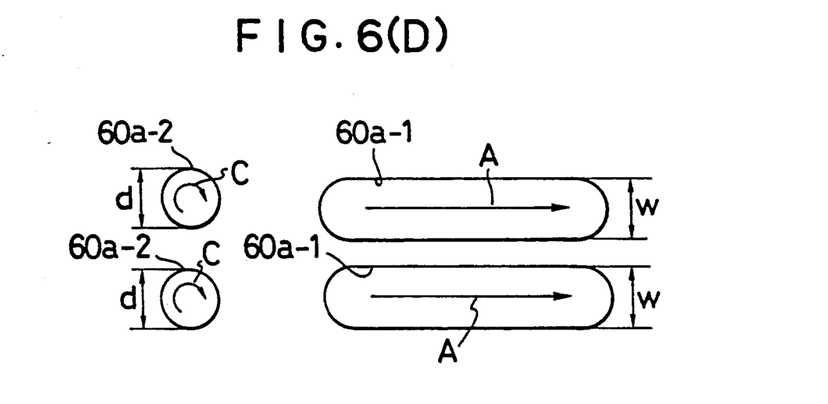
FIG. 6(D) is a top view showing a pair of parallel-arranged sets of circular and slot-shaped guide holes formed in the guide member.

FIG. 6(A) shows a single slot 60a-1 formed along the longitudinal direction A of the cleaning cloth 30A. The width W of the guide slot 60a-1 is designed to be a little wider than the diameter of the ferrule 2, so that the ferrule 2 can be inserted into the guide slot 60a-1 and moved therealong in the longitudinal direction A of the cleaning cloth 30A. FIG. 6(B) shows a singular circular guide hole 60a-2. The diameter d of the guide hole 60a-2 is determined a little longer than that of the ferrule 2, so that the ferrule 2 can be inserted into the guide hole 60a-2 and rotated therealong in the clockwise direction C, for instance. FIG. 6(C) shows a set of series-arranged guide slot 60a-1 and guide hole 60a-2 both formed in the same surface of the guide member 60. Further, FIG. 6(D) shows a pair of parallel-arranged sets of series-arranged guide slot 60a-1 and guide hole 60a-2, by which it is possible to further utilize the broader area of the cleaning cloth 30A.

Without being limited thereto, however, it is also possible to form any guide hole into such a shape that the side surface of the ferrule 2 can be guided along at least a part of the inside surface of the guide hole 60a of the guide member 60. Further, when a plurality of guide holes of different shapes are formed, it is possible to clean various portions of the ferrule 2 in addition to the ferrule end surface. In summary, when the ferrule 2 is cleaned along the guide hole formed in the guide member 60, it is possible to standardize the movement distance and the cleaned ferrule position more securely and stably.

Figure 7A:
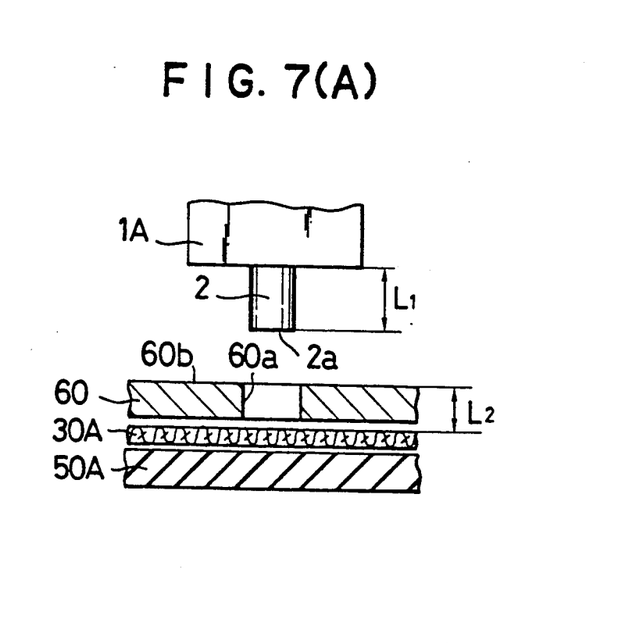
FIGS. 7(A) is an enlarged cross-sectional view showing the cleaning cloth and the elastic member before use.
Figure 7B:
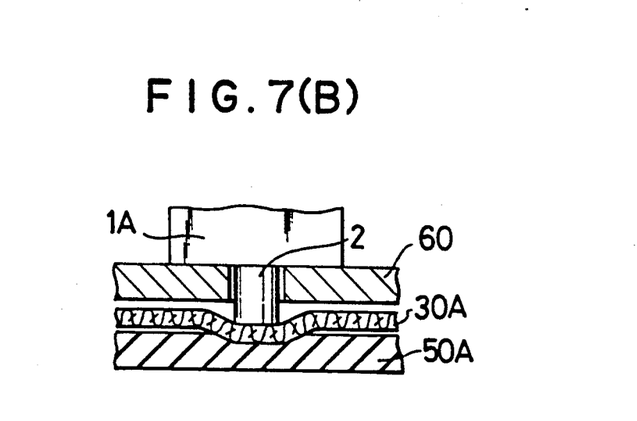
FIG. 7(B) is a similar view showing the deformed cleaning cloth and elastic member in use.

FIGS. 7(A) and (B) show the states before and after the ferrule 2 is inserted into the guide hole 60a of the guide member 60. In general, an optical fiber is bonded at the center of the ferrule 2, and the ferrule 2 is supported within a connector plug body 1A so as to be axially movable by means of a coil spring (not shown). That is, the ferrule 2 is pushed into the plug body 1A by deforming the coil spring.

In using the optical connector cleaner, the take-up reel 42 is rotated to expose a new clean portion of the cleaning cloth 30A on the elastic member 50A. Here, as shown in FIG. 7(B), the ferrule 2 is inserted into a guide hole 60a of the guide member 60 so that the lower end surface of the plug body 1A is brought into contact with the surface 60b of the guide member 60. Under these conditions, when the ferrule end surface 2a is brought into contact with the cleaning cloth 30A, the coil spring within the plug body 1A and the elastic member 50A are both deformed. Therefore, in this embodiment, it is preferable that a length $L_1$ of the ferrule 2 projecting from the plug body 1A is determined to be a little longer than a distance $L_2$ between the upper surface 60b of the guide member 60 and the upper surface of the cleaning cloth 30A. As a result, it is possible to make constant the contact pressure between the ferrule end surface 2a and the cleaning cloth 30A. Under these conditions, when the optical connector 1 is moved in the longitudinal direction A of the cleaning cloth 30A along the guide hole 60a and of the guide member 60 as shown in FIG. 6(A), the ferrule end surface 2a can be securely cleaned.

In this embodiment as described above, since a movement distance of the optical connector 1 can be determined along the longitudinal direction A of the guide slot 60a-1 of the guide member 60 and further the pressure against the cleaning cloth 30A can be determined constant, it is possible to simplify the cleaning work and make uniform the cleanness.

Figure 8A:
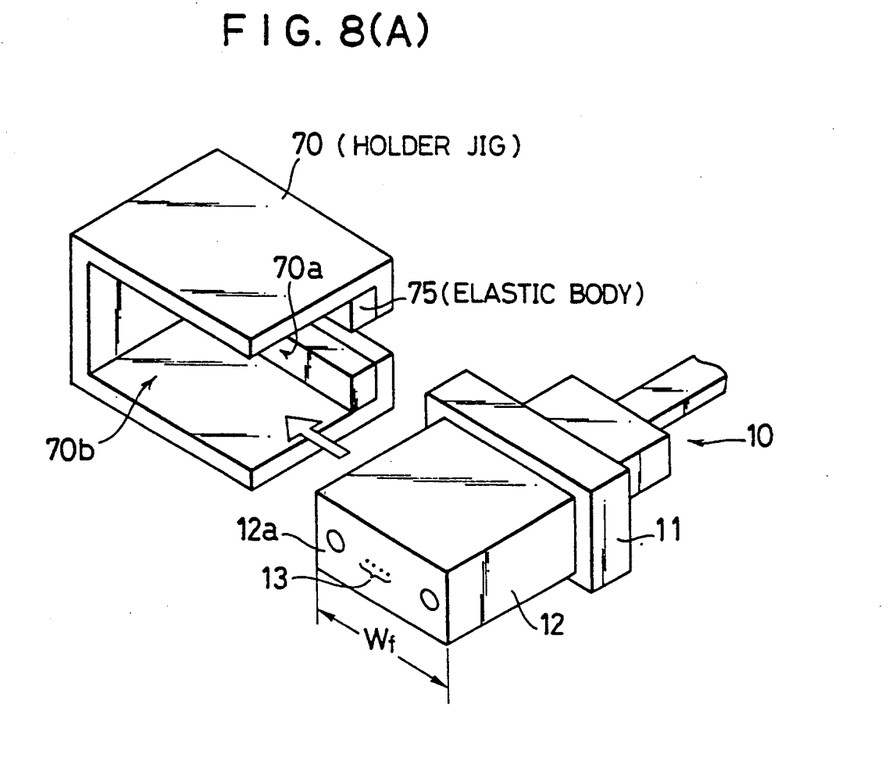
FIG. 8(A) is an enlarged perspective view showing a ferrule holder jig suitable for use in a multifiber optical connector.

FIG. 8(A) shows an optical connector holder jig 70 suitable for use with a multifiber optical connector 10.

Figure 8B:
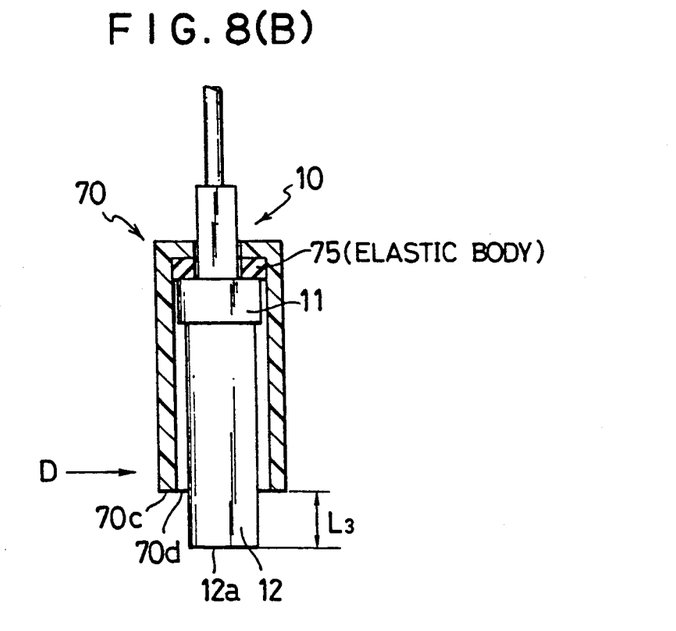
FIG. 8(B) is a cross-sectional view showing the multifiber optical connector coupled to the ferrule holder jig shown in FIG. 8(A) via an elastic body.

As shown in FIG. 8(A), a multifiber optical connector plug 10 is composed of a plug body 11 and a ferrule 12 rigidly fixed to the plug body 11. A plurality of optical fibers 13 are bonded near the middle portion of the ferrule 12 being arranged along a straight line. On the other hand, an optical connector holder jig 70 is formed with an opening 70a into which one side surface of the plug body 11 can be inserted in such a way that the ferrule 12 projects from the lower end surface 70c of the opening 70b, as shown in FIG. 8(B). Further, an elastic body 75 is fixed on the upper inner surface of the holder jig 70 so as to be sandwiched between the plug body 11 and the holder jig 70. That is, the optical connector holder jig 70 is so constructed as to support the multifiber optical connector plug 10 via the elastic body 75 disposed in contact with the upper side (remote side from the optical fibers 13) of the plug body 11. A projection distance of the ferrule 12 from the holder jig 70 is $L_3$, as shown in FIG. 8(B).

Figure 9A:
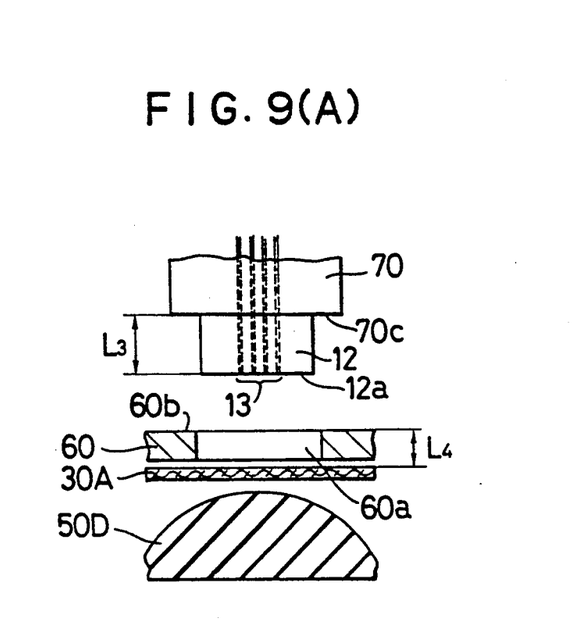
FIG. 9(A) is an enlarged cross-sectional view showing the cleaning cloth and a semicylindrical elastic member before use.
Figure 9B:
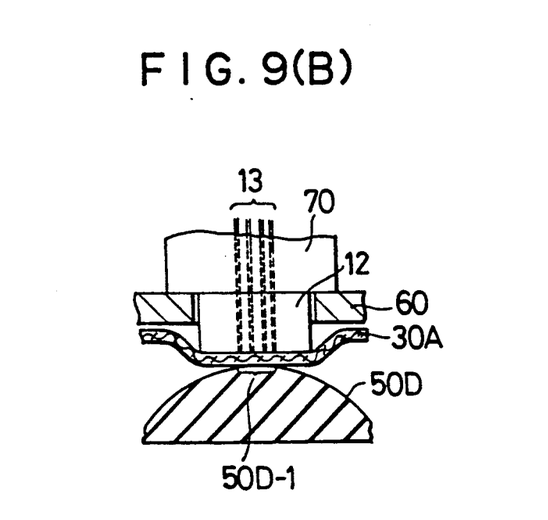
FIG. 9(B) is a similar view showing the deformed cleaning cloth and semicylindrical elastic member in use.

FIGS. 9(A) and (B) show the states before and after the above-mentioned multifiber optical connector plug 10 is inserted into the guide hole 60a of the guide member 60, when seen from the direction D in FIG. 8(B). As shown in FIG. 9(B), the ferrule 12 is inserted into the slot-shaped guide hole 60a by gripping the holder jig 70 so that the end surface 70C of the holder jig 70 is brought into contact with the upper surface 60b of the guide member 60. Here, since the projection distance $L_3$ of the ferrule 12 is determined to be a little longer than that $L_4$ between the upper surface 60b of the guide member 60 and that of the cleaning cloth 30A, when the ferrule end surface 12a is brought into contact with the cleaning cloth 30A, the elastic body 75 for receiving the optical connector plug 10 and the semicylindrical elastic member 50D disposed under the cleaning cloth 30A are both deformed. In other words, the ferrule end surface 12a and the cleaning cloth 30A are in contact with each other under a constant pressure. In addition, as the width W of the guide hole 60a is designed to be a little wider than that $W_f$ of the ferrule 12, the movement of the ferrule in the width direction can be limited. Therefore, when the ferrule 12 is moved in the axial direction of the semicylindrical elastic member 50D (perpendicular to the width direction of the guide hole 60a) by use of the holder jig 70, it is possible to simply, securely and uniformly clean the ferrule end surface 12a.

Further, in this embodiment, the upper surface of the semicylindrical elastic member 50D is formed into an arcuate shape when seen along the ferrule movement direction or from the cleaning cloth longitudinal direction in such a way that the middle portion of the elastic member 50D projects upward toward the cleaning cloth 30A. Therefore, when the upper portion 50D-1 of the elastic member 50D is brought into contact with the part of the ferrule end surface 12a at which the optical fibers 13 are arranged, the elastic member 50D can be deformed flat according to the shape of the ferrule end surface 12A. As described above, in the case of the multifiber optical connector plug 10 such that a plurality of optical fibers 13 are bonded near the middle portion of the ferrule 12, it is possible to apply a uniform and constant pressure to the end surfaces of the optical fibers 13, thus stabilizing the cleaning conditions at the ferrule end surface 12a.

Figure 10:
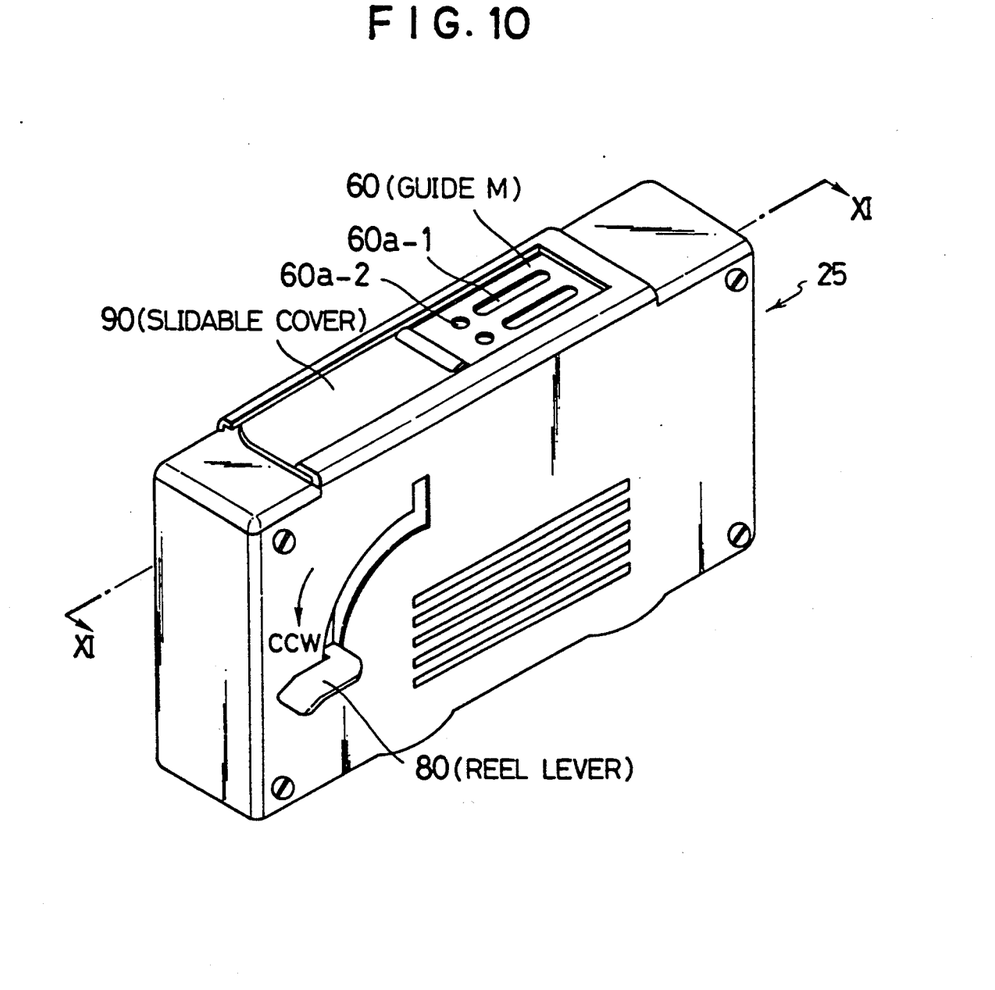
FIG. 10 is a perspective view showing a third embodiment of the optical connector cleaner according to the present invention, in which a reel lever and a slidable cover are additionally provided in linkage with each other.

FIG. 10 shows a third embodiment of the present invention, in which the cleaning cloth is enclosed within the casing 25 in dustproof structure. This embodiment is suitable for use at optical connector work sites. That is, the supply reel, the guide rollers, the take-up reel are all arranged within the casing 25, and when a reel lever 80 is pivoted counterclockwise CCW, the cleaning cloth is shifted a predetermined stroke and simultaneously a slidable cover 90 is moved to expose the guide member 60 on the cleaning cloth.

Figure 11A:
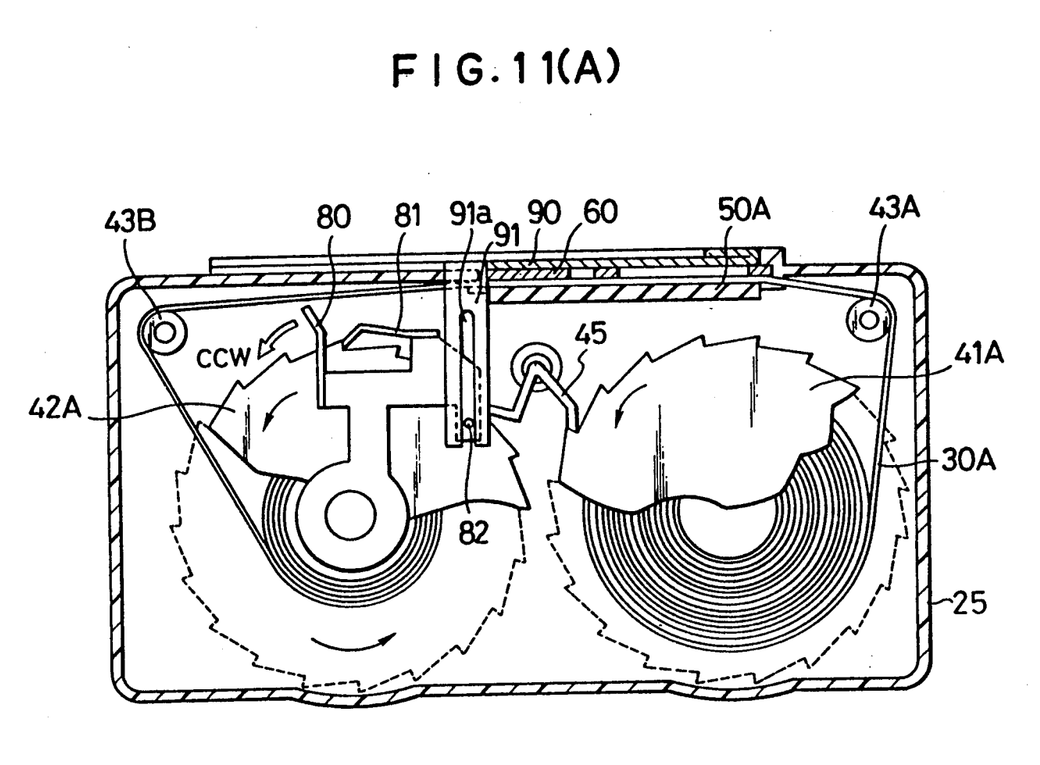
FIG. 11(A) is a side, partially cross-sectional view showing the third embodiment of the cleaner before use, taken along the line XI—XI in FIG. 10.
Figure 11B:
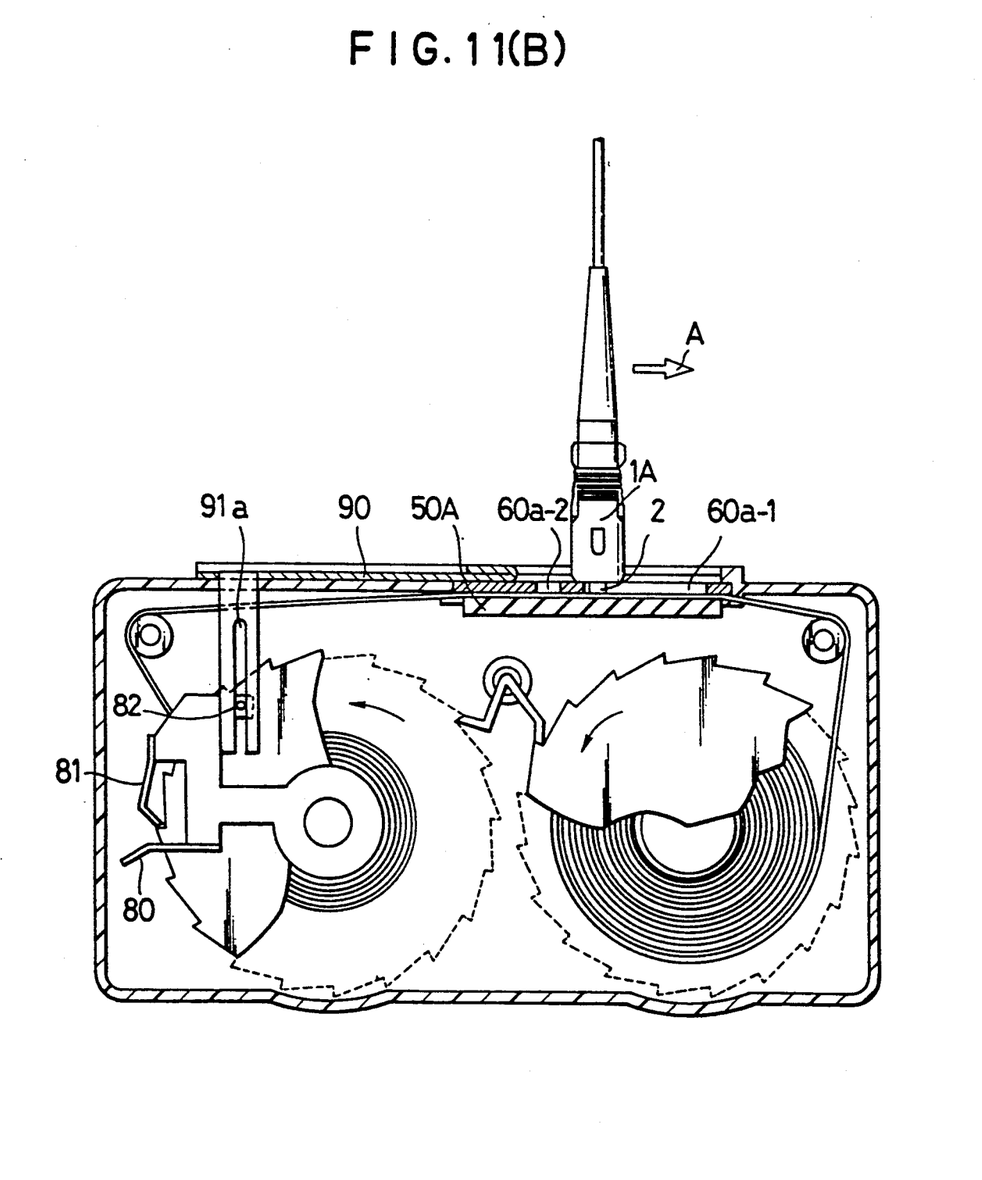
FIG. 11(B) is the similar view showing the same in use.

In more detail with reference to FIGS. 11(A) and (B), the supply reel 41 is formed by two supply reel ratchet wheels 41A between which the cleaning cloth 30A is wound, and the take-up reel 42 is formed by two take-up reel ratchet wheels 42A between which the cleaning cloth 30A is wound. However, it is also possible to fix one or two ratchet wheels to the ordinary supply or take-up reel 41 or 42 of the second embodiment shown in FIG. 3, without forming each ratchet wheel integral with each reel wheel.

A reel lever 80 is pivotally attached at the center of the take-up reel ratchet wheels 42A, independently from the ratchet wheels 42A. The reel lever 80 is formed with a take-up reel drive pawl 81 engaged with a tooth of the take-up reel ratchet wheel 42A and a slidable cover moving pin 82. A slidable cover 90 is slidably disposed on the upper surface of the casing 25 and formed with an inward extending pin guide plate 91 in which an open slot 91a is formed so as to be engaged with the slidable cover moving pin 82. Further, a bifurcated pawl 45 for preventing each reverse rotational motion of each of the supply and take-up reel ratchet wheels 41A and 42A is pivotally disposed between the two ratchet wheels 41A and 42A.

The tape-shaped cleaning cloth 30A wound around the supply reel ratchet wheel 41A is guided via a first guide roller 43A, passed between the guide member 60 and the elastic member 50 guided via a second guide roller 43B, and then wound about the take-up reel ratchet wheel 42A.

FIG. 11(A) shows a state before use. Under these conditions, the slidable cover 90 covers the openings of the guide member 60, and the reel lever 80 is positioned roughly vertically. When the reel lever 80 is pivoted counterclockwise CCW as shown by the arrow, the take-up reel drive pawl 81 pivots the take-up reel ratchet wheel 42A, so that the cleaning cloth 30A is shifted by a predetermined stroke between the guide member 60 and the elastic member 50A. At the same time, since the slidable cover 90 is moved along two grooves formed at the upper end surfaces of the casing 25, the guide member 60 is exposed; that is, the cleaning cloth 30A is exposed, as shown in FIG. 11(B).

Thereafter, the ferrule 2 of the optical connector 1 is inserted into one of the guide holes 60a-1 or 60a-2 of the guide member 60 so that the ferrule end surface is brought into pressure contact with the cleaning cloth 30A on the elastic member 50A. In the cleaning operation, the ferrule 2 is moved straight or rotated along the guide hole 60a-1 or 60a-2 formed in the guide member 60.

Further, after the ferrule end surface has been cleaned, the reel lever 80 is returned to the original position as shown in FIG. 11(A). In this case, the drive pawl 81 is deformed radially outward and pivoted clockwise passing over several teeth of the ratchet wheel, because the two ratchet wheels 41A and 42A will not be rotated in the reverse (clockwise) direction by the pawl 45. In this third embodiment, since the cleaning cloth 30A can be exposed by moving the slidable cover 90 only when the reel lever 80 is moved, it is possible to protect the cleaning cloth from external dust.

Figure 12:
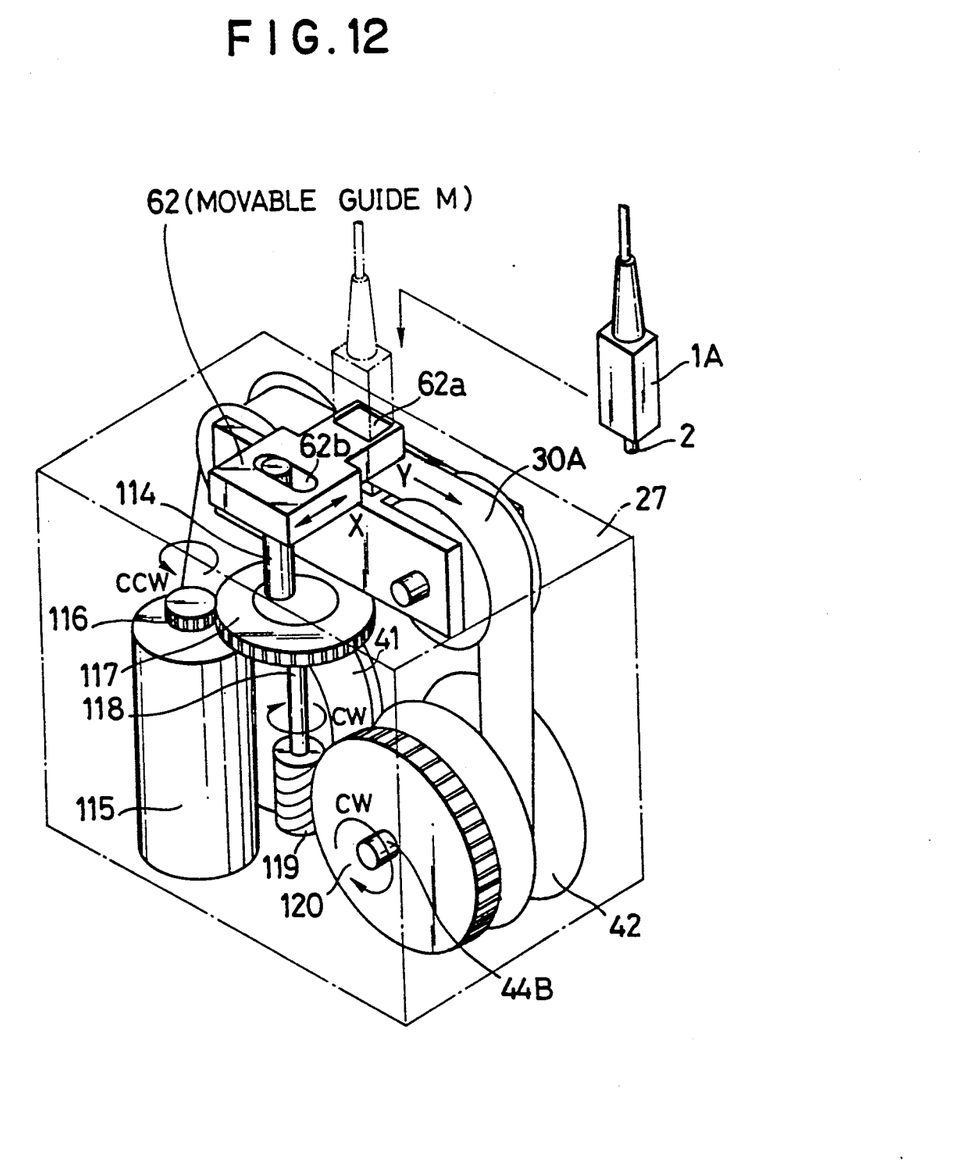
FIG. 12 is a perspective view showing a fourth embodiment of the optical connector cleaner according to the present invention, in which the take-up reel and the guide member are both driven by a motor in two crossing directions in synchronism with each other.

FIG. 12 shows a fourth embodiment of the present invention, in which the cleaning cloth is enclosed within the casing 27 in dustproof structure and further the take-up reel 42 and a guide member 62 are both moved by a motor 115 in synchronism with each other. This embodiment is suitable for use in an optical connector assembly process.

In more detail, a movable guide member 62 is disposed outside the upper surface of a casing 27 so as to be movable in the direction X perpendicular to the cleaning cloth running direction Y. This movable guide member 62 is formed with a connector locating hole 62a into which the plug body 1A of the optical connector 1 is fitted and with a slot 62b extending in the direction Y. Further, the frame 27 is formed with a guide hole (not shown) similar to that 22a as with the case of the second embodiment shown in FIG. 3, under the above connector locating hole 62a.

The mechanism for driving the movable guide member 62 and the take-up reel 42 comprises a motor 115, a drive pinion 116 fixed to a motor shaft (not shown) of the motor 115, a driven gear 117 fixed to a drive shaft 118 rotatably supported by the casing 27 and geared with the drive pinion 116, a worm gear 119 fixed to the drive shaft 118, a worm wheel 120 fixed to the take-up reel shaft 44B and geared with the worm gear 119, and an eccentric shaft 114 fixed upright to the upper surface of the drive gear 117 and engaged with the slot 62b formed in the movable guide member 62.

In use, since the drive pinion 116 is rotated by the motor 115 counterclockwise CCW, for instance, the driven gear 117 is also rotated about the drive shaft 118 clockwise CW, so that the take-up reel 42 is rotated clockwise CW about the take-up reel shaft 44B to shift the cleaning cloth 30A in the direction Y. Therefore, the cleaning cloth 30A under the guide hole 62a is always kept exchanged with a new clean surface of the cleaning cloth 30A. On the other hand, since the eccentric shaft 114 is rotated by the driven gear 117 along the slot 62b of the guide member 62, the guide member 62 is moved to and fro in the direction X perpendicular to the cloth running direction Y. Further, in this case since the longitudinal length of the slot 62b is designed to be a little longer than the eccentricity of the eccentric shaft 114, the movable guide member is not moved in the direction Y.

In the fourth embodiment, since the cleaning cloth 30A is always running in the direction Y and the guide member 62 is always moved to and fro in the direction X, it is possible to automatically clean the ferrule end surface of the optical connector 1 by only inserting the ferrule 2 into the guide hole 62a of the movable guide member 62, thus further facilitating reliable ferrule end cleaning work despite the simple operation.

As described above, in the optical connector cleaner according to the present invention, it is possible to microscopically clean the ferrule end surface with a dry cloth, without use of any cleaning solvent, resulting in a simple operation. Further, when the optical connector holder jig and/or the guide member is used, it is possible to more reliably clean the ferrule end surface.

What is claimed is:

1. An optical connector cleaner and holder jig for cleaning multifiber ferrule end surfaces of a multifiber optical connector which includes a plug body and a ferrule, said cleaner comprising:
   (a) a cleaning cloth woven with ultrafine fiber less than 0.1 denier;
   (b) a casing formed with at least one opening, for protecting said cleaning cloth from dust;
   (c) a ratchet mechanism for intermittently shifting said cleaning cloth exposed in the at least one opening for cloth renewing, after the ferrule end surface has been rubbed with said cleaning cloth along the opening formed in said casing;
   (d) a guide member formed with a set of circular and slot guide holes arranged in series in a direction in which the ferrule end is moved with a diameter and a width slightly larger than a diameter of the ferrule end, respectively, the guide member being disposed at the opening formed in said casing and over said cleaning cloth, for guiding the ferrule end surface along inner edge surfaces of said guide holes with the ferrule end surface brought into pressure contact with said cleaning cloth; and
   (e) a holder jig adapted for holding said multifiber optical connector to facilitate cleaning of the multifiber ferrule end surfaces, said holder jig including:
      (i) a U-shaped cross-section jig housing formed with an opening for holding said multifiber optical connector plug body therewithin such that the ferrule of the optical connector projects from said jig housing; and
      (ii) an elastic body attached to said holder jig housing and disposed between an inner surface of said holder jig housing and an outer surface of said plug body of the multifiber optical connector, for applying an appropriate cleaning pressure to the optical connector via said holder jig, when the optical connector housed in said holder jig is fitted into one of the guide holes formed in said guide member.

2. The optical connector cleaner and holder jig of claim 1, wherein said cleaning cloth is a disk-shaped cloth when wound on a support member; said casing is formed with a slot opening; and said ratchet mechanism for shifting includes a shaft for rotatably supporting said disk-shaped cloth at a center portion thereof and within said casing.

3. The optical connector cleaner and holder jig of claim 1, wherein said cleaning cloth is a tape; and said ratchet mechanism for shifting comprises a supply reel for supplying said cleaning cloth tape and a take-up reel for taking-up said cleaning cloth tape from said supply reel.

4. The optical connector cleaner and holder jig of claim 3, wherein said ratchet mechanism for shifting further comprises:
   (a) a first guide roller for guiding said cleaning cloth near said supply reel;
   (b) a second guide roller for guiding said cleaning cloth near said take-up reel; and
   (c) a guide roller support member for rotatably supporting each of said first and second guide rollers within said casing to guide said cleaning cloth under the opening formed in said casing.

5. The optical connector cleaner and holder jig of claim 1, which further comprises an elastic member disposed at the opening formed in said casing and under said cleaning cloth, for applying an elastic pressure to the ferrule end surface to be cleaned when the ferrule end surface is brought into pressure contact against said cleaning cloth.

6. The optical connector cleaner and holder jig of claim 5, wherein said elastic member is a flat elastic body formed with a middle straight ferrule guide groove.

7. The optical connector cleaner and holder jig of claim 5, wherein said elastic member is a cylindrical elastic body formed with an annular ferrule guide groove and rotatably supported within said casing.

8. The optical connector cleaner and holder jig of claim 5, wherein said elastic member is a semicylindrical elastic body elongated along an axial direction in which the ferrule end surface is moved.

* * * * *